Dec. 7, 1943. S. L. C. COLEMAN 2,336,225
ROTARY ENGINE
Filed Sept. 4, 1940 2 Sheets-Sheet 1

Inventor
Stephen Leonard Chauncey Coleman
By
Munn, Anderson & Liddy
Attorneys

Dec. 7, 1943.  S. L. C. COLEMAN  2,336,225
ROTARY ENGINE
Filed Sept. 4, 1940  2 Sheets-Sheet 2
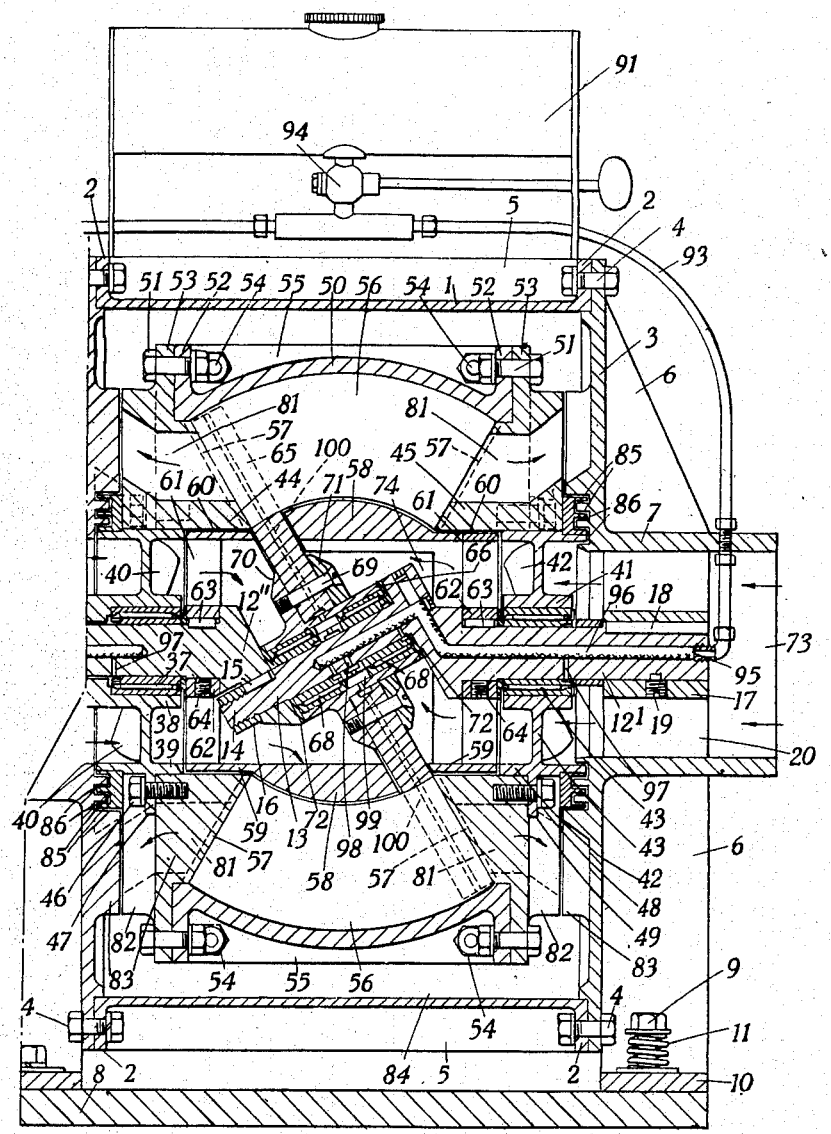
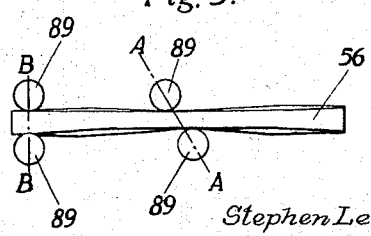
Inventor
Stephen Leonard Chauncey Coleman
By
Munn, Anderson & Liddy
Attorneys Patented Dec. 7, 1943

2,336,225

UNITED STATES PATENT OFFICE 2,336,225

ROTARY ENGINE

Stephen Leonard Chauncey Coleman, Melbourne, England, assignor of one-half to Red Hugh McLean, St. John, New Brunswick, Canada Application September 4, 1940, Serial No. 355,345
In Great Britain September 7, 1939

11 Claims. (Cl. 230—140)

This invention relates to rotary engines (including compressors and pumps) of the type in which a casing encloses around a shaft an annular space having a peripheral wall in the form of the equatorial zone of a hollow sphere and side walls constituted by inwardly directed truncated cones whose bases are in contact with the edges of the peripheral wall, this space being divided by diametrically opposed partitions or vanes, and in which a disc member, inclined to the axis of the engine and rotatable about its own axis, is mounted in the casing and maintains line contact with the conical end walls thereof as the casing revolves.

The chief object of the invention is to produce a rotary engine, pump or compressor of the "cone and disc" type, that has no rubbing contacts, and which can be operated efficiently at comparatively high speeds, resulting in a great increase in output, with no increase in dimensions.

Another object of the invention is to produce an engine, pump or compressor of the "cone and disc" type, in which the inlet ducts and ports can be made with very large areas, without the necessity of enlarging the diameter of the rotor bearings.

Another object of the invention is to produce a rotary engine, pump or compressor of the "cone and disc" type, in which true rolling action takes place in the contact points between the disc and vanes or partitions.

Another object of the invention is to produce a rotary engine, pump or compressor, of the "disc and cone" type, in which the outlet ports of the rotor are controlled without the use of moving valve parts, or the setting up of any frictional drag.

Another object of the invention is to produce a machine of the type mentioned, in which the bearings are so located that they are cooled by the incoming fluid.

Another object of the invention is to produce a rotary engine, pump or compressor of the "cone and disc" type, which is so constructed that lubrication is only required for the bearings, and is controlled by wick feeds.

Another object of the invention is to produce a rotary engine, pump or compressor of the "cone and disc" type, so constructed that the inlet ports are always open, and are open to each separate compartment being charged, during approximately a 315 degree rotation of the rotor, at the same time permitting a 225 degree compression stroke.

Another object of the invention is to produce a rotary engine, pump or compressor of the "cone and disc" type, in which both the induction and expulsion of the fluid is expedited by the fan action of certain parts, and by centrifugal force.

A further object of the invention is to produce a compressor of the "cone and disc" type, which has work chambers on each side of the disc, and separate inlets to carry the fluid to the work chambers on each side of the disc, making a dual machine, which through suitable outside controls would give as wide a variation of output, as would two single machines of an equal total volumetric capacity.

Numerous other objects, advantages, and inherent functions of the invention will be apparent from the following description, which taken in connection with the accompanying drawings, discloses a selected embodiment of my invention.

A specific embodiment of which the new or improved features, combinations and arrangements of parts form in themselves parts of the invention will now be described in some detail with reference to the accompanying drawings in which—

Figs. 1 and 1A taken together show a cross-section of this embodiment,

Fig. 3 is a diagram showing the form of the vanes.

Figure 1:
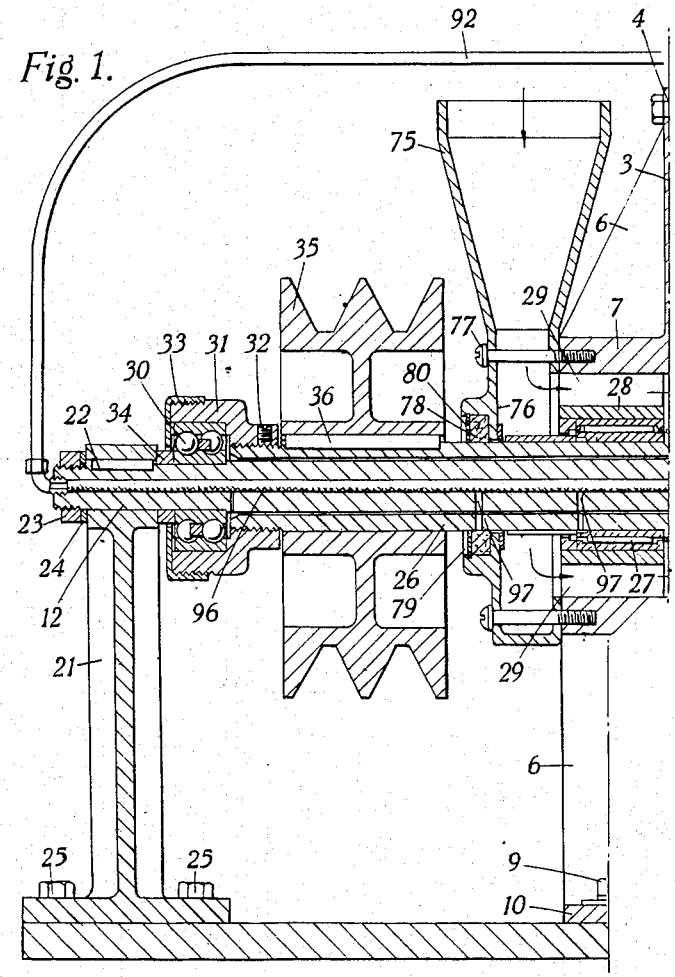

For the sake of clarity, this embodiment will be described in relation to its application as a rotary compressor but it will be understood that the invention is not restricted to such applications but is applicable equally to rotary engines or pumps.

The machine has a stationary outer casing comprising a cylindrical member 1 having flanges 2 at each end to which end plates 3 are secured by bolts or the like 4. The cylindrical member 1 is provided with a number of external fins 5 and the end plates 3 have external fins 6 radiating from central hollow cylindrical hub portions 7. The cylinder member 1 has an outlet port (not shown) arranged at a tangent to its periphery.

This outer casing is mounted on a base plate 8 to which it is bolted by bolts 9 passing through lugs 10 on the end plates 3. The bolts 9 at one end pass through slots and springs 11 are inserted between the bolts and the lugs 10 so that lengthwise movement due to expansion of the outer casing is permitted.

A shaft 12 having an inclined portion or crank 13 is mounted substantially coaxially of the cylinder 1 with the inclined portion substantially midway between the end plates 3.

This shaft, as shown, comprises two coaxial parts 12', 12'', one of which (12') is formed integrally with the crank 13. A threaded portion 14 of the crank 13 passes through a bore in the end of the shaft 12'' and is secured thereto by a key 15 and a nut 16.

The shaft 12 is fixed at one of its ends in an inner cylindrical hub 17 on the end plate 3, a key 18 and a grub screw 19 securing the shaft in position. The inner hub 17 is connected by radial spokes 20 to the interior of the hollow outer hub 7.

The other end of the cranked shaft passes through a bore in the top of a pedestal 21 bolted to the base plate 8 by bolts 25 and is secured against movement by a key 22. Longitudinal movement of the shaft 12 is prevented by a nut 23 and a spring lock washer 24.

A tubular shaft 26 surrounds the portion 12'' of the crank shaft and is rotatable about it. A needle roller bearing 27 surrounds the tubular shaft 26 and is supported in an inner cylindrical hub 28 of the end plate 3, this hub being connected to the outer hub 7 of this end plate by spokes 29.

The outer end of the tubular shaft 26 is supported on a ball bearing 30 mounted on the shaft 12, the housing 31 of this ball bearing being threaded on to the tubular shaft 26 and secured against movement by a set screw 32. A cup-shaped dust ring 33 is threaded on to the housing 31 and a spacer ring 34 is provided between the bearing 32 and the pedestal 21.

A grooved pulley 35 is keyed to the tube 26 by a key 36.

The inner end of the tubular shaft 26 is supported from the shaft 12'' by a needle roller bearing 37 and carries a wheel-like structure 38 having a rim 39 and spokes 40. These spokes are placed at an angle so that when the tubular shaft 26 is revolved they act as an induction fan.

A similar wheel like structure 41 is carried by the shaft 12' at the other side of the inclined crank portion 13. This structure 41 has a rim 42 and inclined spokes 42' and is mounted on a needle-roller bearing 43. The two wheel like structures 38 and 41 carry the rotor of the compressor.

The end walls of the rotor are formed by members 44, 45 each of truncated cone shape, the face angle of the cone being equal to the angle which the inclined crank 13 makes with the shaft 12. The cone 44 is fixed to the wheel 38 by bolts 46 passing through a flange 47 on the wheel 38 and the cone 45 is similarly fixed to the wheel 41 by bolts 48 passing through a flange 49.

A central wall 50 connects the two end walls of the rotor and is bolted thereto by bolts 51 passing through flanges 52 on the wall 50 and flanges 53 on the end walls 44, 45. This wall 50 is for convenience in assembly formed in two parts fixed together by bolts 54. Fins 55 for cooling the rotor are provided on the exterior of the wall 50 and the bolts 54 pass through fins 55 contiguous one another. The fins 55 also act as fan blades to increase the velocity of fluid in and leaving the outer case.

The inner surface of the wall 50 is the shape of an equatorial zone of a hollow sphere and is coaxial with the axis of the fixed shaft 12, the centre of the hollow sphere being at the point of intersection of the inclined crank 13 with the axis of the shaft 12.

The interior of the rotor is divided by two vanes 56 into two equal chambers. The vanes 56 are in the same plane as the axis of the shaft 12 and are diametrically opposed to each other. They are held on the outer edges by the bolts 54 between the two parts of the outer wall and at each side they fit tightly into grooves 57 formed in the conical faces of the end walls 44, 45.

The inner edges of the vanes 56 are shaped to fit with slight clearance (for example about two thousandths of an inch) a central hollow spherical hub formed in two parts 58. The centre of this hub is concentric with the centre of the hollow sphere of which the inner surface of the wall 50 is an equatorial zone.

Each hub part 58 has a cylindrical portion 59 at its outer end which fits closely with slight clearance into a bore 60 in the centre of the adjacent end wall 44 or 45. This portion 59 is hollow and is concentric with the axis of the shaft 12. It is connected by spokes 61 to a hub 62 which is rigidly mounted on the stationary shaft 12 being secured by a key 63 and set screw 64.

A disc 65 divides the interior of the rotor diagonally into two parts. It is mounted on a cylindrical hub 66 which surrounds the cranked shaft portion 13 being mounted on needle roller bearing 68. The disc 65 is held by bolts or the like 69 between a flange 70 on the hub 66 and a loose flange 71. Endwise adjustment of the disc on the cranked shaft 13 is effected by means of shims 72.

Figure 2:
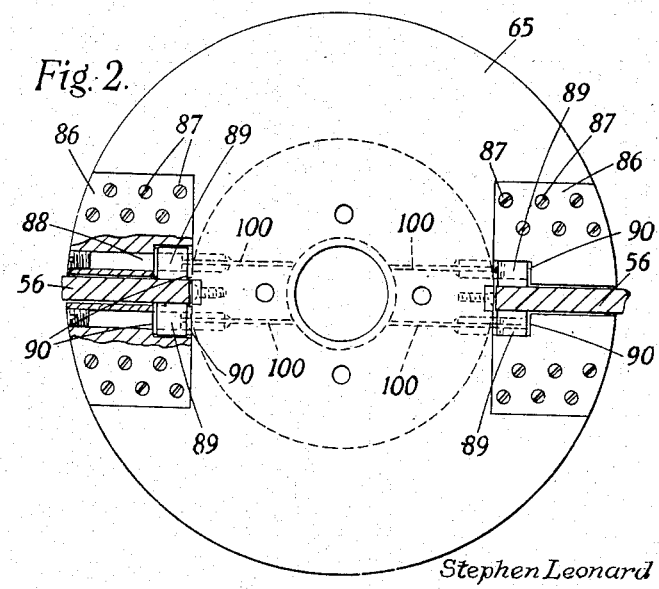
Fig. 2 is an elevation of the rotor disc.

This disc 65 lies in a plane at right angles to the inclined crank 13 and consequently its inclination to the axis of the conical end walls of the rotor and its position relative thereto are such that some part of one of its faces always makes radial line contact with some part of the adjacent truncated conical wall and some part of its opposite face always makes radial line contact with some part of the other truncated conical wall.

Where the vanes 56 and the disc 65 intercept, the latter is slotted as shown in Fig. 2 and when the rotor revolves the vanes 56 push the disc 65 ahead of them.

To provide effective sealing between the disc 65 and the vanes 56, the slots in the disc are fitted with jaw-pieces 86 which have side walls straddling the disc and countersunk flush with it. The jaw pieces are held by screws or rivets 87. For the greater part of the length of the slot, each jaw piece 86 fits very closely to the adjoining vane without contacting them, the edges adjoining the vane being rounded. A journal shaft 88 is fitted tightly in a bore parallel with the rounded edge of the slots. The shaft 88 is threaded into the jaw piece at its outer end and projects into the disc proper. On each shaft 88 is mounted a needle roller bearing 89 which contacts the vane 56; each bearing is flanked by washers 90.

It will be apparent that, since the axis on which the disc 65 revolves is at an angle to that on which the rotor revolves during rotation of both parts the angle between the disc and the vanes changes. The extent of this change is shown diagrammatically in Fig. 3 in which the two extreme positions of the disc 65 in relation to the vane 56 is shown by the lines A—A, B—B. The vertical distance between the rollers 89 varies because of the changing angle and for this reason, both surfaces of the vane are made concave. The most acute angle occurs when the disc is at the centre of the vanes and the vanes are therefore thinnest at their centre.

It will be seen that the machine has two compressor assemblies one on each side of the disc 65 and each has its own inlet duct and port. For the compressor on the right hand side of the machine as shown in Fig. 1 the inlet comprises the hollow interior 73 of the circular hub 7 through which the incoming air passes to the interior of the central spherical hub part 59 and 58 and thence by a port 74 to the induction chambers.

For the other compressor, an inlet pipe 75 of funnel shape with its axis substantially vertical, leads to a circular member 76 secured to the hub 7 of the left-hand end plate by screws 77. A sealing washer 78 of felt or the equivalent is mounted in a recess 79 of the member 76 and surrounds the tubular shaft 26. This sealing washer is retained in its recess 79 by a spring ring 80. Air passes through the funnel 75 and the member 76, through the interior of the hub 7 to the interior of the central spherical hub part 59 and 58 and thence by a port (similar to the port 74 but not shown in Figs. 1, 1A) to the induction chamber.

The rotor has four discharge ports and there are four discharges for each revolution of the rotor. The discharge ports 81 are formed in the conical end members 44 and 45 of the rotor and are inclined upwardly at their outer ends to lessen the resistance to the flow of fluid after it leaves the rotor. These discharge ports 81 are positioned just ahead of the adjacent vanes 56 in the direction of rotation. Two of them are shown in full lines in Fig. 1 and the other two (which are the other side of the vane 56) are shown in dotted lines.

The outer end of each outlet port 81 passes through a raised boss 82 on the outer wall of the members 44 and 45 and the inner surfaces of the end walls have raised semicircular bosses 83 such that when an outlet port boss 82 is opposite a boss 83 the clearance is extremely small and the corresponding port 81 is closed.

The semicircular boss 83 at the left hand side of the rotor is on the opposite side of a vertical plane through the shaft axis to that at the right hand side of the rotor. The timing of the discharges through the outlet ports is clearly governed by the length and position of the semi circular bosses 83.

Air discharged through the outlet port 81 when this is not opposite the bosses 83 passes to the space 84 within stationary casing 1 around the outside of the rotor and thence passes through an outlet pipe arranged at a tangent to the periphery of the stationary casing (not shown).

To prevent escape of air from and consequent rapid lowering of pressure in the outer case, a labyrinth seal is provided at each end between the rotor and the end wall. These seals are formed by a series of concentric steel rings 85 carried by the rim 39 (or 42) of the wheel like structure 40 (or 41) and engaging spaced concentric grooves 86 formed in the inside of the end walls 3 of the outer case.

Lubrication of the rotating parts is provided by gravity feed from an oil tank 91 through oil pipes 92, 93 which lead to the opposite ends of the stationary cranked shaft 12, to which they are connected by oil tight screw fittings. A shut off valve 94 is provided to control the supply of oil from the tank 91.

The shaft 12 is bored to provide an oil conduit 95 which is filled with a wick 96 to make the feed of oil positive though slow. Small transverse bores 97 lead the oil from the wick 96 to the various bearings surrounding the shaft 12.

A small transverse bore 98 at the centre of the inclined crank portion 13 feeds oil into a circular reservoir space 99 in the centre of the disc hub 66 from which it is carried by centrifugal force through small ducts 100 to the roller bearings 89 located in the jaws 86 of the disc 65.

The operation of the machine as a rotary air compressor will now be apparent. Power is applied to the tube 26 by belt drive on to the pulley 35 and the rotor, comprising the conical end walls 44, 45, the central portion 50 and the two vanes 56, rotates as a unit on its own axis, whilst the disc 65 revolves on its axis being pushed ahead by the vanes 56.

Considering one side of the disc, as the rotor vanes advance the volume of the chamber behind them steadly increases whilst the volume ahead of them steadily decreases to zero. The fluid in front of the vanes is compressed and is finally forced out of the chamber through the outlet ports ahead of the vanes. At the same time the space behind the vanes is receiving fluid through the inlet ports located in the stationary hub, the fan-like structures 40, 42 acting to draw in the fluid through the inlets 73 and 75.

It is to be noted that the inlet ports are always open thus ensuring a steady uninterrupted flow of fluid, and that the compressor assemblies, one on each side of the disc, each discharges twice per revolution, making a total of four discharges per revolution of the rotor.

In order to permit the rotor to be operated at high speed, all rubbing surfaces have been eliminated from the machine. The disc is balanced and rotates on its own axis always in the same plane. The rotor is also in perfect balance.

The location of the main bearings in the intake duct ensures that they will keep cool at high speeds, and this location also permits the use of small diameter bearings, most suitable for high speed work.

The roller bearings in the jaws of the disc which contact the vanes, are so placed that they have the shortest possible travel across the vanes during rotation of the rotor, and they are located in the coolest part of that chamber, adjoining the inlet port.

Many variations of the device are possible without departing from its fundamental principles. For instance it could be driven by gears instead of by belts, or by fluid under pressure introduced into the chamber on one or both sides of the disc, in which case it would become a rotary engine. It could also be used as a pump.

The device would also operate satisfactorily if mounted on its side, and driven by a vertical shaft.

In the case of large machines it would be preferable to use tapered rollers in the jaws of the disc in order to eliminate slip, in such a case a corresponding angular track would be cut in the face of the vanes to accommodate the tapered roller, thus ensuring a perfect rolling action at this important point.

It will also be understood that the invention is not restricted to the details of the specific form described which may be modified without departure from the broad ideas underlying them.

I claim:
1. A rotary engine comprising a shaft, fluid inlet means, a rotatable casing enclosing around the shaft an annular space communicating with said inlet means and having a peripheral wall in the form of the equatorial zone of a hollow sphere and side walls constituted by inwardly directed truncated cones whose bases are in contact with the edges of the peripheral wall, diametrically opposed partitions dividing said space into a plurality of chambers, a disc inclined to the axis of the shaft and mounted to rotate about its own axis in the casing and to maintain line contact with the conical end walls thereof as the casing revolves, a stationary casing having a fluid outlet surrounding the rotatable casing, and having end walls closely adjacent to the side walls of the rotary casing, the side walls of said rotary casing having outlet ports therethrough and the end walls of the stationary casing being formed to open and close these outlet ports as the casing rotates to discharge the fluid under pressure from said chambers to the stationary casing.

2. A rotary engine comprising a shaft, fluid inlet means, a rotatable casing enclosing around the shaft an annular space communicating with said inlet means and having a peripheral wall in the form of the equatorial zone of a hollow sphere and side walls constituted by inwardly directed truncated cones whose bases are in contact with the edges of the peripheral wall, diametrically opposed partitions dividing said space into a plurality of chambers, a disc inclined to the axis of the shaft, and mounted to rotate about its own axis in the casing and to maintain line contact with the conical end walls thereof as the casing revolves, a stationary casing having a fluid outlet surrounding the rotatable casing, and having end walls closely adjacent to the side walls of the rotary casing, the side walls of said rotary casing having outlet ports therethrough and the end walls of the stationary casing being formed with arcuate bosses which lie closely adjacent to and obturate the outlet ports during part of each revolution of the rotary casing to discharge the fluid under pressure from said chambers to the stationary casing.

3. A rotary engine comprising a fixed shaft having an inclined crank portion, a rotatable casing enclosing around the shaft an annular space provided with a fluid inlet and having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing said space, a disc rotatably mounted on the inclined crank portion of the shaft so as to maintain line contact with the conical end walls of the casing as it revolves, a tubular shaft surrounding part of the fixed shaft and in driving connection with the rotary casing and a stationary casing having a fluid outlet surrounding the rotary casing and controlling the passage of fluid through ports in the end walls of the rotary casing from the latter to the stationary casing.

4. A rotary engine comprising a fixed shaft having an inclined crank portion, a rotatable casing enclosing around the shaft an annular space provided with a fluid inlet and outlet and having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing said space, a disc rotatably mounted on the inclined crank portion of the shaft so as to maintain line contact with the conical end walls of the casing as it revolves, wheel like structures rotatably mounted on the fixed shaft and supporting the rotary casing, and a spherical hub portion fixedly mounted centrally on the fixed shaft and slotted to receive and to allow rotation of the disc, the partitions of the rotary casing conforming with slight clearance to the periphery of this spherical hub.

5. A rotary engine comprising a fixed shaft having an inclined crank portion, a rotatable casing enclosing around the shaft an annular space provided with a fluid inlet and having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing said space, a disc rotatably mounted on the inclined crank portion of the shaft so as to maintain line contact with the conical end walls of the casing as it revolves, wheel like structures rotatably mounted on the fixed shaft and supporting the rotary casing, a spherical hub portion fixedly mounted centrally on the fixed shaft and slotted to receive and to allow rotation of the disc, the partitions of the rotary casing conforming with slight clearance to the periphery of this spherical hub and the spherical hub portion being hollow and formed with ports communicating with said inlet and the annular space of the rotary casing on each side of the disc, and fluid discharge control means communicating with said annular space.

6. A rotary engine as defined in claim 5 in which the wheel like structures have spokes formed as fan-blades adapted to induce a flow of fluid from each end of the rotary casing to the central hub.

7. A rotary engine comprising a fixed shaft having an inclined crank portion, a rotatable casing enclosing around the shaft an annular space having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing said space into two chambers each having fluid inlet means, fluid outlet means communicating with each of said chambers, and a disc rotatably mounted on the inclined crank portion of the shaft so as to maintain line contact with the conical end walls of the casing as it revolves, said disc having slots through which the vanes pass and roller bearings fitted with their axes parallel to the edges of these slots and contacting the surfaces of the vanes, said roller bearings extending along short lengths at the bottom of the slots and the edges of the slots for the remainder of their length being rounded off and having a slight clearance with the vanes.

8. A rotary engine comprising a shaft, a rotatable casing enclosing around the shaft an annular space provided with a fluid inlet and having a peripheral wall in the form of the equatorial zone of a hollow sphere and side walls constituted by inwardly directed truncated cones whose bases are in contact with the edges of the peripheral wall, diametrically opposed vanes dividing said space, a disc inclined to the axis of the shaft, and mounted to rotate about its own axis in the casing and to maintain line contact with the conical end walls thereof as the casing revolves, a stationary casing surrounding the rotatable casing and having end walls closely adjacent to the side walls of the rotary casing, ports establishing communication between said inlet and the interior of said rotatable casing, the side walls of said rotary casing having outlet ports therethrough at positions just ahead of the vanes in the direction of rotation of the casing, and the end walls of the stationary casing being formed to open and close these outlet ports as the casing rotates.

9. A rotary engine as defined in claim 8 in which the outer ends of the outlet ports are directed outwardly from the axis of the rotary casing.

10. A rotary engine comprising a fixed shaft having an inclined crank portion, a rotatable casing enclosing around the shaft an annular space having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing said space, a disc rotatably mounted on the inclined crank portion of the shaft so as to maintain line contact with the conical end walls of the casing as it revolves, a stationary hollow hub having inlet ports on each side of said disc, and an inlet duct on the outside of the fixed shaft communicating with said space and ports, and valve means operated by the movement of said casing to control the flow of fluid from said space.

11. A rotary engine comprising a fixed shaft having an inclined crank portion, a rotatable casing enclosing around the shaft an annular space having a peripheral wall in the form of the equatorial zone of a hollow sphere concentric with the intersection of the axes of the shaft and the inclined crank portion and side walls constituted by inwardly directed truncated cones whose bases are in contact with the edges of the peripheral wall, diametrically opposed partitions dividing this space, a disc rotatably mounted on the inclined crank portion of the shaft so as to maintain line contact with the conical end walls of the casing as it revolves, a stationary hollow hub having inlet ports on each side of said disc, and two inlet ducts on the outside of the fixed shaft one on each side of the rotatable casing communicating with said space and ports respectively, and valve means operated by the movement of said casing to control the flow of fluid from said space.

STEPHEN LEONARD
CHAUNCEY COLEMAN.